United States Patent
Lin (10) Patent No.: US 7,151,976 B2
(45) Date of Patent: Dec. 19, 2006

(54) MULTIVARIATE CONTROL OF SEMICONDUCTOR PROCESSES

(75) Inventor: Kuo-Chin Lin, Cupertino, CA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 11/229,153

(22) Filed: Sep. 16, 2005

(65) Prior Publication Data

US 2006/0111804 A1    May 25, 2006

Related U.S. Application Data

(60) Provisional application No. 60/611,136, filed on Sep. 17, 2004.

(51) Int. Cl.
*G06F 19/00* (2006.01)

(52) U.S. Cl. ............... 700/108; 700/121; 702/182

(58) Field of Classification Search ........ 700/108–110, 700/121; 702/183, 184, 182, 185
See application file for complete search history.

(56) References Cited

U.S. PATENT DOCUMENTS

| | | | |
|---|---|---|---|
| 5,408,405 A | 4/1995 | Mozumder et al. | 364/151 |
| 5,479,340 A | 12/1995 | Fox et al. | |
| 6,153,115 A | 11/2000 | Le et al. | |
| 6,368,883 B1 * | 4/2002 | Bode et al. | 438/14 |
| 6,442,445 B1 | 8/2002 | Bunkofske et al. | |
| 6,528,331 B1 * | 3/2003 | Bode et al. | 438/14 |
| 6,718,224 B1 * | 4/2004 | Firth et al. | 700/121 |
| 6,741,903 B1 * | 5/2004 | Bode et al. | 700/121 |
| 6,830,939 B1 | 12/2004 | Harvey et al. | |
| 6,968,253 B1 * | 11/2005 | Mack et al. | 700/121 |
| 2003/0065462 A1 | 4/2003 | Potyrailo | 702/81 |
| 2004/0083065 A1 | 4/2004 | Daniel et al. | |
| 2004/0116814 A1 | 6/2004 | Stranc et al. | |
| 2005/0028932 A1 | 2/2005 | Shekel et al. | |
| 2005/0037515 A1 | 2/2005 | Nicholson et al. | |
| 2005/0130321 A1 | 6/2005 | Nicholson et al. | |
| 2005/0234574 A1 * | 10/2005 | Lam et al. | 700/96 |

FOREIGN PATENT DOCUMENTS

DE     101 14 211 A1    11/2001
DE     100 40 731 A1    3/2002

OTHER PUBLICATIONS

Goodlin et al., "Simultaneous Fault Detection and Classification for Semiconductor Manufacturing Tools," 201st Meeting of the Electrochemical Society, International Symposium on Plasma Processing XIV, Abs. 413, Philadelphia, PA, May 2002 (16 pages).

(Continued)

*Primary Examiner*—Zoila Cabrera
(74) *Attorney, Agent, or Firm*—Proskauer Rose LLP (57) ABSTRACT

A method for detecting a fault condition of a manufacturing process involving acquiring data and developing a model based on a plurality of manufacturing related variables for a plurality of outputs of a manufacturing process. The method also involves identifying which of the manufacturing related variables have a substantial affect on the model for detecting faulty outputs of the manufacturing process. The method also involves updating the model by using the manufacturing related variables identified as having a substantial affect on the model to improve the ability of the model to detect faulty outputs of the manufacturing process.

11 Claims, 8 Drawing Sheets

OTHER PUBLICATIONS

Goodlin et al., "Simultaneous Fault Detection and Classification for Semiconductor Manufacturing Tools," Journal of the Electrochemical Society, 150 (12) G778-G784 (2003).

Gallagher et al., "Development and Benchmarking of Multivariate Statistical Process Control Tools for a Semiconductor Etch Process: Improving Robustness through Model Updating," Eigenvector Research, Inc., (6 pgs.) first viewed at least Sep. 9, 2004.

Chen et al., "Plasma Etch Modeling using Optical Emission Spectroscopy," J. Vac. Sci. Technol. A 14(3), May/Jun. 1996 (pp. 1901-1906).

Lymberopoulos et al., "Advanced Process Control Comes of Age," Jul. 1, 2004 http://www.reed-electronics.com/semiconductor/index.asp?layout=articlePrint&article ID=... (pp. 1-6).

Skumanich et al., "Advanced Etch Applications Using Tool-Level Data," Copyright 2005, PennWell Corporation, http://sst.pennet.com/articles/article_display.cfm?section=arch&article_id=2064708.vers..., Jun. 2004 (pp. 1-7).

Mason et al., "Applying Hotelling's $T^2$ Statistic to Batch Processes," Journal of Quality Technology, vol. 33, No. 4, Oct. 2001 (pp. 466-479).

Smith et al., "Process Leaps Without New Hardware," European Semiconductor, The Source for Europe, Middle East and Africa, www.eurosemi.eu.com, Nov. 2004 (4 pages).

"TOOLweb Blue Box Professional: Enabling High Speed, Multi-User Connectivity and Data Sharing," Control & Information Technology, www.mksinst.com, Mar. 2005 (4 pages).

"TOOLweb SenseLink: Web-Enables Existing Sensors," Control & Information Technology, www.mksinst.com, Dec. 2004 (4 pages).

"TOOLweb: APC & e-Diagnostics Suite," Control & Information Technology, www.mksinst.com, Nov. 2004 (4 pages).

"TOOLweb Applications Support: AEC/APC Applications Engineering, Integration and Deployment Support," Control & Information Technology, www.mksinst.com, Sep. 2005 (4 pages).

Smith et al., "From Sensor Data to Process Control: A Networked Framework," Semiconductor Manufacturing Magazine, Jul. 2004 (6 pages).

Wold et al., "Modeling and Diagnostics of Batch Processes and Analogous Kinetic Experiments," Chemometrics and Intelligent Laboratory Systems 44 (1998) (pp. 331-340).

Martin et al., "Multovariate Statistical Process Control and Process Performance Monitoring," *IFAC Dynamics and Control of Process Systems*, 1998, pp. 347-356.

Kresta et al., "Multivariate Statistical Monitoring ofProcess Operating Performance," *The Canadian Journal of Chemical Engineering*, vol. 69, Feb. 1991, pp. 35-47.

"User's Guide to SIMCA-P, SIMCA-P+," *By Umetrics AB*, Version 11.0, May 17, 2005.

* cited by examiner

MULTIVARIATE CONTROL OF SEMICONDUCTOR PROCESSES

RELATED APPLICATIONS

This application claims priority to U.S. provisional application Ser. No. 60/611,136, filed on Sep. 17, 2004, and entitled "Multivariate Control of Semiconductor Processes."

FIELD OF THE INVENTION

The present invention relates to methods and apparatus for detecting fault conditions of manufacturing processes and classifying fault types associated with outputs of manufacturing processes.

BACKGROUND OF THE INVENTION

Historically, semiconductor device manufacturers have managed the transition to tighter process/materials specifications by depending on process tool manufacturers to design better and faster process/hardware configurations. As device geometries shrink to the nanometer scale, however, the increasing complexity of manufacturing processes has changed the landscape that must be negotiated to meet and maintain process/materials specifications.

Stand-alone control of process tools (based on equipment state data) will not maintain viable yields at 65 and 45 nm. Advanced device processing requires tool-level control based on the combination of advanced equipment control (AEC) and sensor based process control. Furthermore, tool level control alone cannot meet all of the control needs of advanced device fabrication. System-wide implementation of advanced process control (APC) that integrates AEC with e-diagnostics, Fault Detection and Classification (FDC) and predictive mathematical models of the device manufacturing process are required.

Economic as well as technological drivers exists for the move to AEC/APC. The cost of purchasing (and developing) stand-alone process tools to meet advanced production specifications is expected to be staggering. A cost effective alternative to the purchase of a new generation of process equipment exists through the combined use of add-on sensors with AEC/APC in existing (legacy) equipment. Sensor-based AEC/APC in legacy equipment can drive these tools to the tighter specifications needed for nanometer-scale device fabrication. Additional cost benefits can be realized from reductions in scrap/rework (especially in 300 mm wafer processing) and in lower test wafer use since these can be reduced or even eliminated in systems using wafer- and/or process-state data for process control. Sensor-based AEC/APC can also reduce preventive maintenance downtimes and time to process qualifications, while increasing process capabilities, device performance, yields and fab throughput.

It seems surprising that AEC/APC is not already widely implemented, given such strong driving forces. However, significant obstacles to AEC/APC exist in most fabrication environments. SECS communications links to process tools are typically unique by OEM, slow and have narrow bandwidths unsuited to data from more sophisticated process sensors. Different OEM and add-on sensors provide data on tool and process states at very different bandwidths and at different sampling rates. The synchronization of data capture and data transmission at the system level thus represents a significant hurdle for AEC/APC implementation.

Further, even should these obstacles be overcome, meaningful application of this potential flood of data in process control is a formidable task. Simpler approaches, such as USPC (univariate statistical process control), are well established, but have limitations. USPC is effective in the control of a single response parameter but advanced device fabrication requires control of multiple response variables simultaneously. Both response and independent variables typically have complex interrelationships that USPC can neither evaluate nor control.

Multivariate analysis (MVA) has proven to be an effective tool in process monitoring involving a large number of monitored parameters, and in particular for fault detection. Multivariate analysis detects process changes seen in parameter covariance and correlation. MVA typically requires the construction of a process reference model based on known acceptable working conditions that serve as a reference.

The reference model can be constructed from measured process parameters. In general, the model can be broken down into individual time-dependent models for the individual process steps, and then reconstructed into an upper level model summarizing the overall process.

All subsequent implementations of fault detection for the process compare the same measured parameters in the same fashion (i.e., modeling process steps and summarizing into an upper level model) and determine statistically significant deviations from the known acceptable processes upon which the reference model is based. Effective implementation of MVA depends in large part on the quality of the model.

A need therefore exists for improved systems and methods for detecting and classifying defects associated with manufacturing processes and outputs of the manufacturing processes.

SUMMARY OF THE INVENTION

The present invention features methods for detecting and classifying fault conditions associated with a manufacturing process.

The invention, in one aspect, features a method for detecting a fault condition of a manufacturing process. The method involves acquiring data associated with a plurality of manufacturing related variables (e.g., variables associated with manufacturing tools, processes, internal, and external sensors) for a plurality of outputs of a manufacturing process. The method also involves developing a model based on the data for detecting faulty outputs of the manufacturing process. The method also involves identifying which of the manufacturing related variables have a substantial affect on the model for detecting faulty outputs of the manufacturing process. The method also involves updating the model by using the manufacturing related variables identified as having a substantial affect on the model to improve the ability of the model to detect faulty outputs of the manufacturing process.

In some embodiments, the model developing, identification, and model updating steps include utilizing a multivariate analysis technique. In some embodiments, the model developing step includes computing principal components and loadings associated with the model using a non-linear iterative partial least square method and singular value decomposition. In some embodiments, the identification step includes utilizing a partial least square discrimination analysis method. In some embodiments, the identification step includes automatically identifying the substantial manufacturing related variables using a mathematical algorithm.

In some embodiments, using a mathematical algorithm includes: i) identifying a linear equation of a selected variable to the origin of the loadings associated with the model, ii) identifying linear equations of the manufacturing related variables that are perpendicular to the linear equation of step i), iii) solving the simultaneous equations between every manufacturing related variable linear equation and the linear equation of step i) to obtain a projection point of each manufacturing related variable on the linear equation of step i), iv) determining the distance between each projection point to the origin, v) calculating a correlation coefficient based on a ratio of distance between the origin and each projected point relative to distance of the selected variable to the origin; and vi) identifying the substantial manufacturing related variables by selecting the manufacturing related variables that have a correlation coefficient greater than a predefined number.

In some embodiments, the selected variable is a fault condition or a metrology metric value. In some embodiments, the predefined number is selected by a user.

In another aspect, the invention relates to a method for classifying a type of fault associated with an output of a manufacturing process. The method includes acquiring data associated with a plurality of manufacturing related variables for a plurality of outputs of a manufacturing process. The method also includes acquiring metrology data associated with a metrology metric associated with the outputs of the manufacturing process. The method also includes developing a model based on the data and the metrology data to identify faults in outputs of the manufacturing process, wherein the model is capable of predicting the metrology metric associated with other outputs of the manufacturing process based on data associated with the plurality of manufacturing variables. The method also includes identifying which of the manufacturing related variables have a substantial affect on the model for predicting the metrology metric associated with other outputs of the manufacturing process. The method also includes updating the model by using the manufacturing related variables identified as having a substantial affect on the model to improve the ability of the model to predict the metrology metric associated with other outputs of the manufacturing process.

In one embodiment, the model developing, identification, and model updating steps include utilizing a multivariate analysis technique. In one embodiment, the model developing step includes computing principal components and loadings associated with the model using a non-linear iterative partial least square method and singular value decomposition. In one embodiment, the model developing step includes utilizing a partial least square method. In one embodiment, the model updating step includes automatically identifying the manufacturing related variables using a mathematical algorithm. In one embodiment, the acquiring metrology data step, the model developing step, the identification step, and the model updating step are repeated to produce models for different metrology metrics.

In another aspect, the invention relates to a method for simultaneously detecting and classifying a fault condition of a manufacturing process. The method includes acquiring data associated with a plurality of manufacturing related variables for a plurality of outputs of a manufacturing process and acquiring fault class data associated with the outputs of the manufacturing process. The method also includes developing a model based on the data and the fault class data for detecting faulty outputs of the manufacturing process. The method also includes identifying which of the manufacturing related variables have a substantial affect on the model for detecting the particular fault class of the faulty outputs of the manufacturing process. The method also includes updating the model by using the manufacturing related variables that have a substantial affect on the model to improve the ability of the model to detect the particular fault class of the faulty outputs of the manufacturing process.

In one embodiment, the acquiring fault class data step, the model developing step, the identification step, and the model updating step are repeated to produce models for different fault classes.

In another aspect, the invention features a system for simultaneously detecting and classifying a fault condition of a manufacturing process. The system includes means for acquiring data associated with a plurality of manufacturing related variables for a plurality of outputs of a manufacturing process and means for acquiring fault class data associated with the outputs of the manufacturing process. The system also includes means for developing a model based on the data and the fault class data for detecting faulty outputs of the manufacturing process. The system also includes means for identifying which of the manufacturing related variables have a substantial affect on the model for detecting the particular fault class of the faulty outputs of the manufacturing process. The system also includes means for updating the model by using the manufacturing related variables that have a substantial affect on the model to improve the ability of the model to detect the particular fault class of the faulty outputs of the manufacturing process.

In one embodiment, a mathematical algorithm is used to automatically develop the model, to identify the variables having a substantial affect on the model, and to update the model.

BRIEF DESCRIPTION OF THE DRAWINGS

The foregoing and other objects, feature and advantages of the invention, as well as the invention itself, will be more fully understood from the following illustrative description, when read together with the accompanying drawings which are not necessarily to scale.

DETAILED DESCRIPTION OF ILLUSTRATIVE EMBODIMENTS

Figure 1:
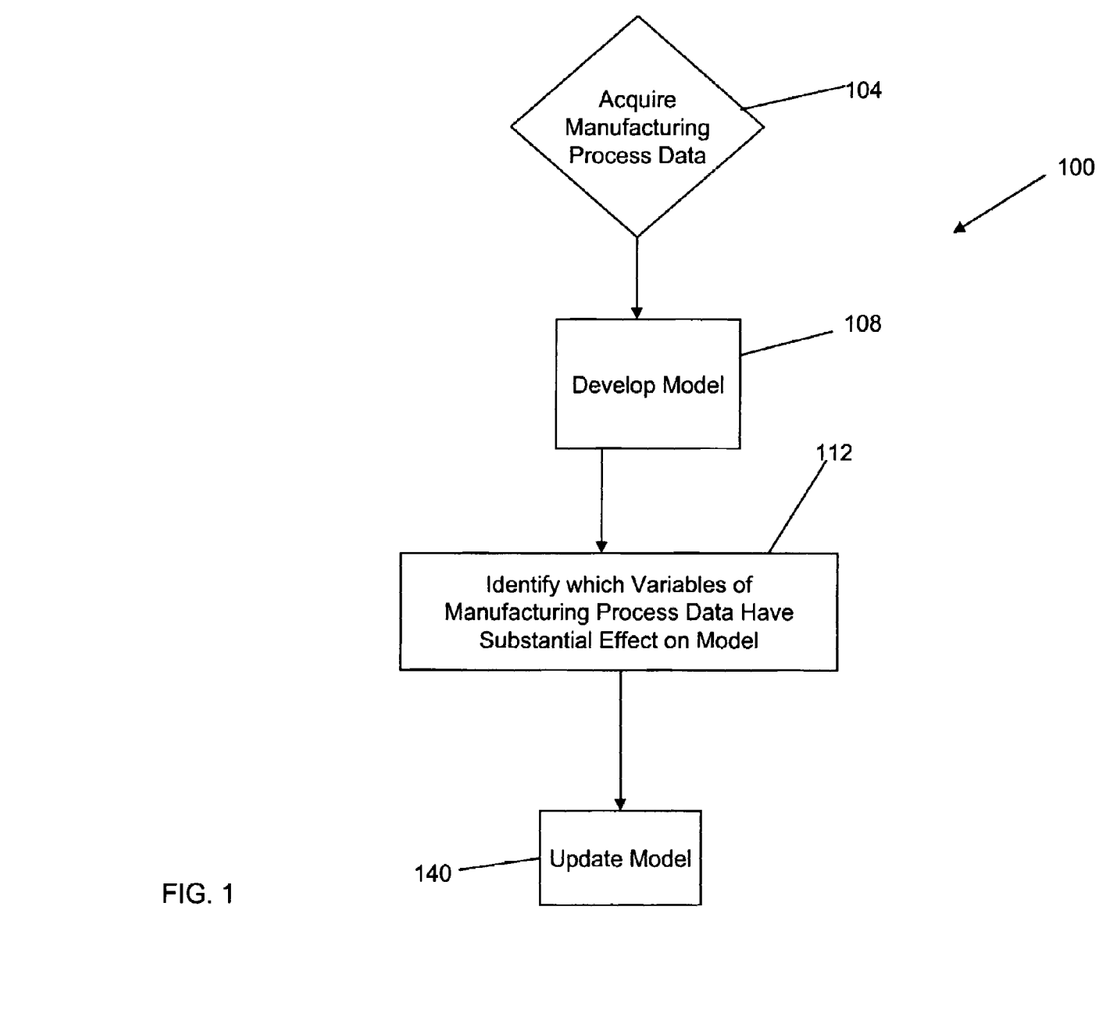
FIG. 1 is a flow diagram of a method for detecting a fault condition of a manufacturing process.

FIG. 1 is a flow diagram 100 of a method for detecting a fault condition of a manufacturing process. The method can be implemented with, for example, a computer processor or personal computer. In this embodiment, the process of the flow diagram 100 begins with acquiring (step 104) data associated with a plurality of manufacturing related variables (e.g., variables associated with manufacturing tools, processes, internal, and external sensors) for a plurality of outputs of a manufacturing process.

Manufacturing related variables may include, for example, gas flow, gas pressure, gas valve position, gas temperature, coolant temperature, delivered power, reflected power, current, voltage, capacitance, resistance, inductance and impedance. Data for manufacturing related variables may be acquired using, for example, one or more sensors (e.g., process sensor, residual gas analyzer, optical emission spectrometer, Fourier transform infrared spectrometer, VI probe, particle counter, gas flow monitor, gas pressure monitor, temperature gage, and self excited electron resonance spectrometer). In one embodiment, the manufacturing process involves removing photoresist material from the surface of semiconductor wafers with a photoresist material as a step in a semiconductor processing procedure. In this embodiment, the method of the invention described with respect to FIG. 1 is used to identify the wafers with photoresist on their surface.

The next step in the flow diagram 100 involves developing (step 108) a mathematical model based on the data acquired (step 104). The next step in the flow diagram 100 involves identifying (step 112) which of the manufacturing related variables have a substantial effect on the model for detecting faulty outputs of the manufacturing process. The next step in the flow diagram 100 involves updating the model by using the manufacturing related variables identified in step 112 to improve the ability of the model to detect faulty outputs of the manufacturing process.

The step of developing (step 108) a mathematical model based on the data acquired (step 104) may involve using any one of a variety of multivariate analysis techniques. By way of example, these techniques may be implemented by using the SIMCA-P+ multivariate analysis software package (Umetrics, offices in Kinnelon, N.J.). In one embodiment, the model developing step (step 108) involves formatting in a matrix X (see EQN. 1) the data acquired (step 104), where the matrix X has N rows and K columns. K is the number of manufacturing related variables (e.g., residual gas analysis spectra measurements) and N is the number of outputs (e.g., observations, number of wafers) of the manufacturing process.

$$X = \begin{bmatrix} 1 & \ldots & \ldots & \ldots & K \\ \ldots & \ldots & \ldots & \ldots & \ldots \\ \ldots & \ldots & \ldots & \ldots & \ldots \\ \ldots & \ldots & \ldots & \ldots & \ldots \\ N & \ldots & \ldots & \ldots & \ldots \end{bmatrix} \quad \text{EQN. 1}$$

The model developing step (step 108) involves calculating the average and standard deviation for each column K of the matrix X. The model developing step (step 108) then involves centering and scaling each column K of the matrix X. The average of each column is subtracted from each entry in the corresponding column of the matrix X (centering). Each entry in the matrix X is then divided by the standard deviation of the corresponding column of the matrix X (scaling).

PCA Method

The Principal Component Analysis (PCA) method is then employed in developing a model (step 108). The PCA method reduces the number of dimensions (K variables) of the original data (original matrix X) down to a few independent variables that are a linear combination of the original data (K variables of original matrix X).

In one embodiment, the model developing step (step 108) then involves determining the principal components and loadings of the model using an non-linear iterative non-linear partial least squares (NIPALS) method, as given by the following equation:

$$X = TP' + E \quad \text{EQN2.}$$

where T is the scores matrix, P is the loading matrix, P' is the transpose of the P matrix, and E is the residual matrix. The scores matrix T is given by:

$$T = [t_1 t_2 \ldots t_A] \quad \text{EQN.3}$$

and the loading matrix P is given by:

$$P = [p_1 p_2 \ldots p_A] \quad \text{EQN.4}$$

where, for example, $t_1$ is the $1^{st}$ principal component and $p_1$ is the $1^{st}$ load vector. The $1^{st}$ principal component ($t_1$) is also referred to as the $1^{st}$ score vector of the X matrix and is a linear combination of the manufacturing related variables. The $2^{nd}$ principal component ($t_2$) is also referred to as the $2^{nd}$ score vector of the X matrix and is a linear combination of the manufacturing related variables. The subscript A is the total number of principal components used to produce the model.

The NIPALS method then involves iteratively employing the following equations:

$$p'_1 = \frac{t'_1 X}{t'_1 t_1} \quad \text{EQN. 5}$$

where starting with an initial condition for the $t_1$ vector initially equal to the column of the X matrix (EQN. 1) having the maximum variance.

The NIPALS method then involves normalizing $p_1$ as follows:

$$\|p_1\| = 1.0 \quad \text{EQN.6}$$

and then employing the following equation:

$$t_1 = \frac{X p_1}{p'_1 p_1} \quad \text{EQN. 7}$$

The calculations of EQNS. 5–7 are then repeated until the calculations converge. By way of example, a user may specify (based on user experience) that the calculations have converged when $$\frac{\|t_1 - t_{1old}\|}{\|t_1\|} \langle 1e-6 \qquad \text{EQN. 8}$$

where $t_{1old}$ is the value of $t_1$ from the prior iteration of performing the calculations using EQNS. 5–7.

The residual matrix E is then determined from the following relationship:

$$E = X - t_1 p_1' \qquad \text{EQN. 9}$$

The residual matrix E is then used in place of matrix X in EQNS. 5 and 7 to calculate the second principal component ($t_2$) and the second load vector ($p_2$). The steps associated with EQNS. 5–9 are then similarly performed for each additional principal component ($t_A$). The methods described herein are applicable to applications involving multiple numbers of principal components.

Principal component coefficients for each observation (e.g., output of the manufacturing process) are then calculated using the equations ($t_A$ vectors) of the principal components (EQN. 3). Users generally use the principal component coefficients to determine if there is any clustering associated with the coefficients. Those principal component coefficients that are close to each other when plotted in A-dimensional space may sometimes have similar properties (where A is the total number of principal components used to produce the model). However, in many cases it is not possible to identify similarities and dissimilarities based on the principal component coefficients because all the original manufacturing related variables have been used to develop the model and each of the variables has been given similar weight (the principal component score is the linear combination of all the variables multiplied by its weight). Accordingly, it is therefore necessary to identify (step 112) those manufacturing related variables that have a substantial effect on the model for detecting faulty outputs of the manufacturing process.

Referring to FIG. 1, step 112 involves performing a partial least squares discrimination analysis (PLSDA) in which those manufacturing related variables are selected that have a substantial effect on the model for detecting faulty outputs of the manufacturing process.

PLS and PLSDA Method

The PLS and PLSDA method is employed as given by the following equations:

$$X = TP' + E \qquad \text{EQN. 10}$$

$$Y = UC' + F \qquad \text{EQN. 11}$$

$$T = XW^* \qquad \text{EQN. 11}$$

$$Y = BX + E \qquad \text{EQN. 12}$$

$$B = W(P'W)^{-1}C' \qquad \text{EQN. 13}$$

where Y is an (M×N) matrix that contains data associated with M features of the N observations, B is the regression coefficient, and where $$W^* = W(P'W)^{-1} \qquad \text{EQN. 14}$$

The M features may, for example, be a specific metrology metric value (PRIndex—a measure of photoresist contamination) associated with each observation (e.g., each wafer) or a class identifier (e.g., wafer has photoresist or wafer does not have photoresist). For example, if a class identifier is used and class 1 represents a wafer having photoresist and class 2 represents a wafer having no photoresist then the Y matrix would be a (2×N) matrix, where column 1 of the Y matrix would have a 1 if the corresponding wafer has photoresist on its surface and a 0 if the corresponding wafer has no photoresist on its surface. Column 2 of the Y matrix would have a 0 if the corresponding wafer has photoresist on its surface and a 1 if the corresponding wafer has no photoresist on its surface.

T is the score matrix of X, and U is the score matrix of Y. W is the X-weight matrix and C is the Y-weight matrix. F is the residual matrix associated with Y. The W matrix is given by:

$$W = [w_1 w_2 \ldots w_A] \qquad \text{EQN. 15}$$

and the C matrix is given by:

$$C = [c_1 c_2 \ldots c_A] \qquad \text{EQN. 16}$$

Similarly as previously described herein, the NIPALS method is used in accordance with the following equations:

$$w_1 = \frac{X^T u_1}{u_1^T u_1} \qquad \text{EQN. 17}$$

Where $u_1$ is set to be equal to one column of the Y matrix as an initial condition. The vector $w_1$ is then scaled to unit length by:

$$\|w_1\| = 1.0 \qquad \text{EQN. 18}$$

The next step in the NIPALS method involves:

$$t_1 = X w_1 \qquad \text{EQN. 19}$$

$$c_1 = \frac{Y^T t_1}{t_1^T t_1} \qquad \text{EQN. 20}$$

$$u_1 = \frac{Y c_1}{c_1^T c_1} \qquad \text{EQN. 21}$$

where the calculations of EQNS. 17–21 are repeated until the calculations converge. By way of example, a user may specify (based on user experience) that the calculations have converged when $$\frac{\|t_1 - t_{1old}\|}{\|t_1\|} \langle 1e-6 \qquad \text{EQN. 22}$$

where $t_{1old}$ is the value of $t_1$ from the prior iteration of performing the calculations using EQNS. 17–21.

Once the calculations have converged, the X loadings are determined from:

$$p_1 = \frac{X^T t_1}{t_1^T t_1} \qquad \text{EQN. 23}$$

The residual matrix E is then determined from the following relationship:

$$E = X - t_1 p_1^t \quad \text{EQN. 24}$$

The residual matrix F is then determined from the following relationship:

$$F = Y - t_1 c_1^t \quad \text{EQN. 25}$$

The residual matrices E and F are then used in place of matrices X and Y in EQNS. 17–25 to calculate the second principal component ($t_2$), second load vector ($p_2$), second score vector of Y ($u_2$), second X-weight vector ($w_2$), and second Y-weight vector ($c_2$). The steps associated with EQNS. 17–25 are then similarly performed for each additional principal component ($t_A$). The methods described herein are applicable to applications involving multiple numbers of principal components.

The next step in determining which of the K manufacturing related variables have a substantial effect on the model detecting the fault condition of the manufacturing process (e.g., presence of photoresist on a wafer output by the manufacturing process) involves plotting the W* matrix and the C matrix. If there are two features (M), then the C matrix will have two values $C_1$ and $C_2$ for each feature which are plotted as coordinates in a plane. The W matrix contains two values for each manufacturing related variable which also are plotted as coordinates in the same plane.

Figure 2:
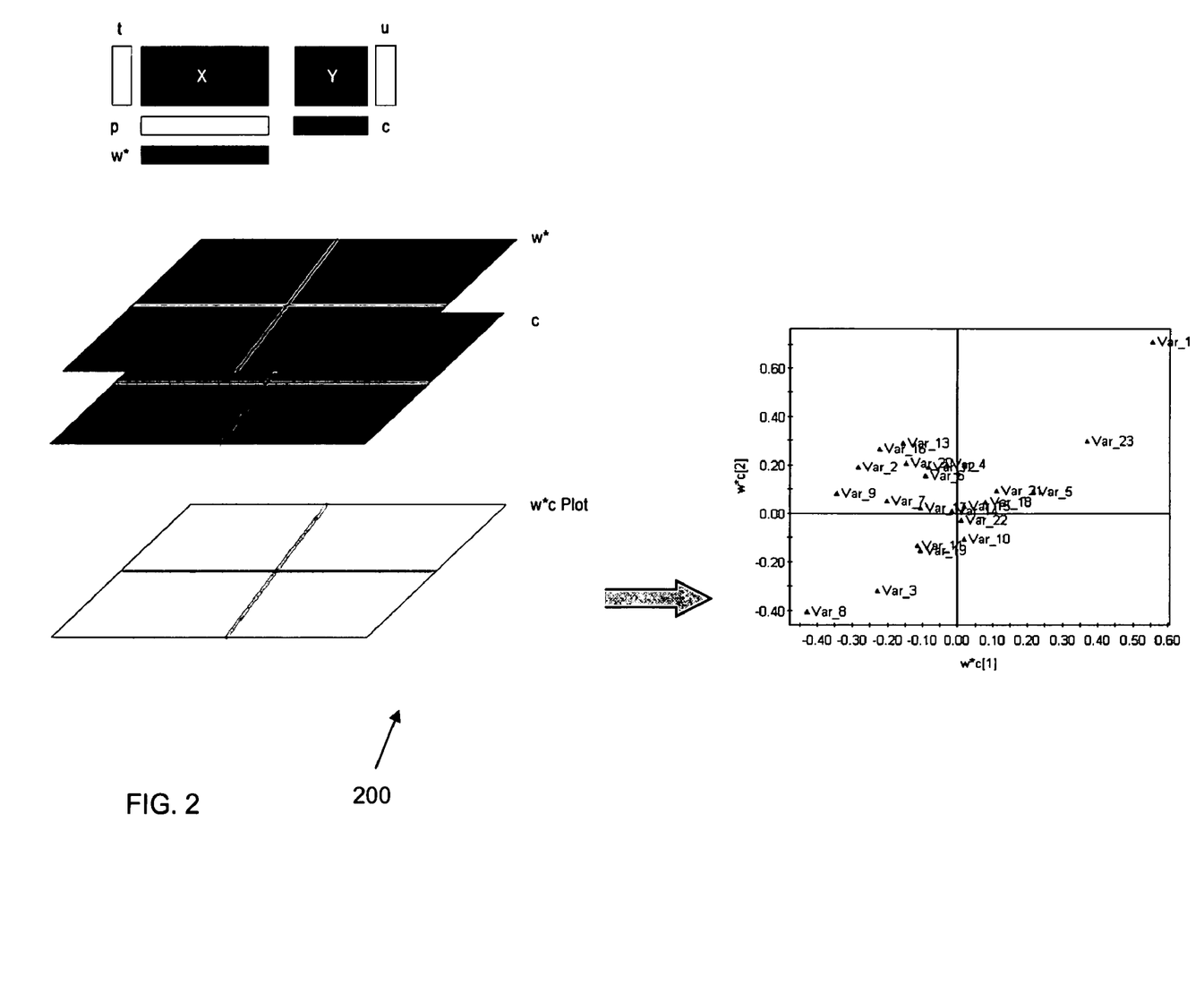
FIG. 2 is a graphical representation of a method used to identify which manufacturing related variables have a substantial effect on the ability of a model to predict faulty outputs of a manufacturing process.

In this manner, the coordinate values of W* and C are superimposed on each other (a conceptual illustration of this superposition is shown in the plot 200 of FIG. 2). Those manufacturing related variable coordinates (W*) that are located in the plane in proximity to a feature have a substantial effect on the model being able to predict whether a given wafer has that particular feature. Only those columns (K) corresponding to the substantial manufacturing related variables are then used to update (step 140 of FIG. 1) the model using EQNS. 1–9. The updated model is then capable of distinguishing between outputs of the manufacturing process to identify which outputs are faulty (e.g., wafer having photoresist).

EXAMPLE

By way of illustration, an experiment was conducted to detect faulty wafers (wafers having photoresist located on the surface of the wafer) of a semiconductor fabrication process. In this experiment, 24 wafers were output by the manufacturing process. Of the 24 wafers, 19 of the wafers (wafers 1, 2, 4, 5, 6, 8, 9, 11, 12, 13, 14, 16, 17, 19, 20, 21, 22, 23, and 24) have no photoresist material located on the surface of the wafer. Wafers 3, 7, 10, 15, and 18 have photoresist on the surface of the wafer.

A residual gas analysis (RGA) was conducted on the wafers to acquire the RGA spectra from 2 AMU through 80 AMU (79 different measurements) for each of the wafers. EQN. 1 was used to format the manufacturing data, the matrix X has K=79 columns (79 measurements for each of 2 AMU through 80 AMU) and N=19 rows (19 wafers corresponding to all the non-photoresist wafers). As described previously herein, the matrix X was then scaled (the average of each column of the matrix X was subtracted from each entry in the corresponding column of the matrix X) and centered (each entry in the matrix X was divided by the standard deviation of the corresponding column of the matrix X).

Figure 3:
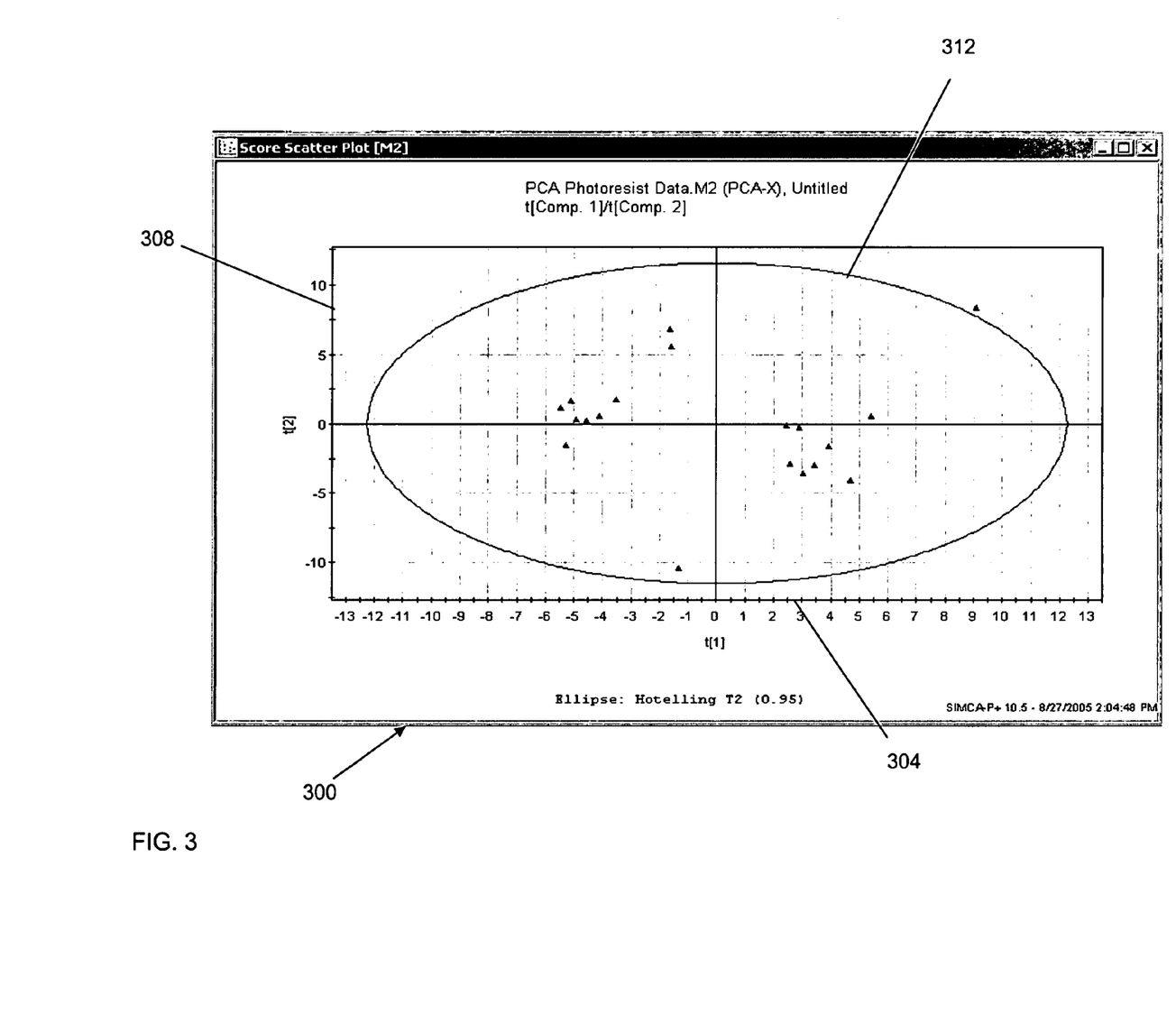
FIG. 3 is a graphical representation of the principal component coefficients ($t_1$ and $t_2$) of non-photoresist wafers calculated based on a model using all the manufacturing related variables.

EQNS. 2–9 were then utilized to calculate the 1$^{st}$ and 2$^{nd}$ principal components ($t_1$ and $t_2$) of the matrix X. FIG. 3 is a plot 300 (produced by using, for example, the SIMCA-P+ analysis software) of the 1$^{st}$ and 2$^{nd}$ principal component coordinates of the 19 wafers (wafers with no photoresist) as calculated using EQNS. 2–9. The X-Axis (304) of the plot 300 is the $t_1$ coefficient. The Y-Axis (308) of the plot 300 is the $t_2$ coefficient. Each wafer having no photoresist is identified on the plot 300 with a triangle. The plot 300 also includes an ellipse 312. The ellipse 312 is a curve of the 95% confidence contour that is calculated using the Hotelling equation.

Figure 4:
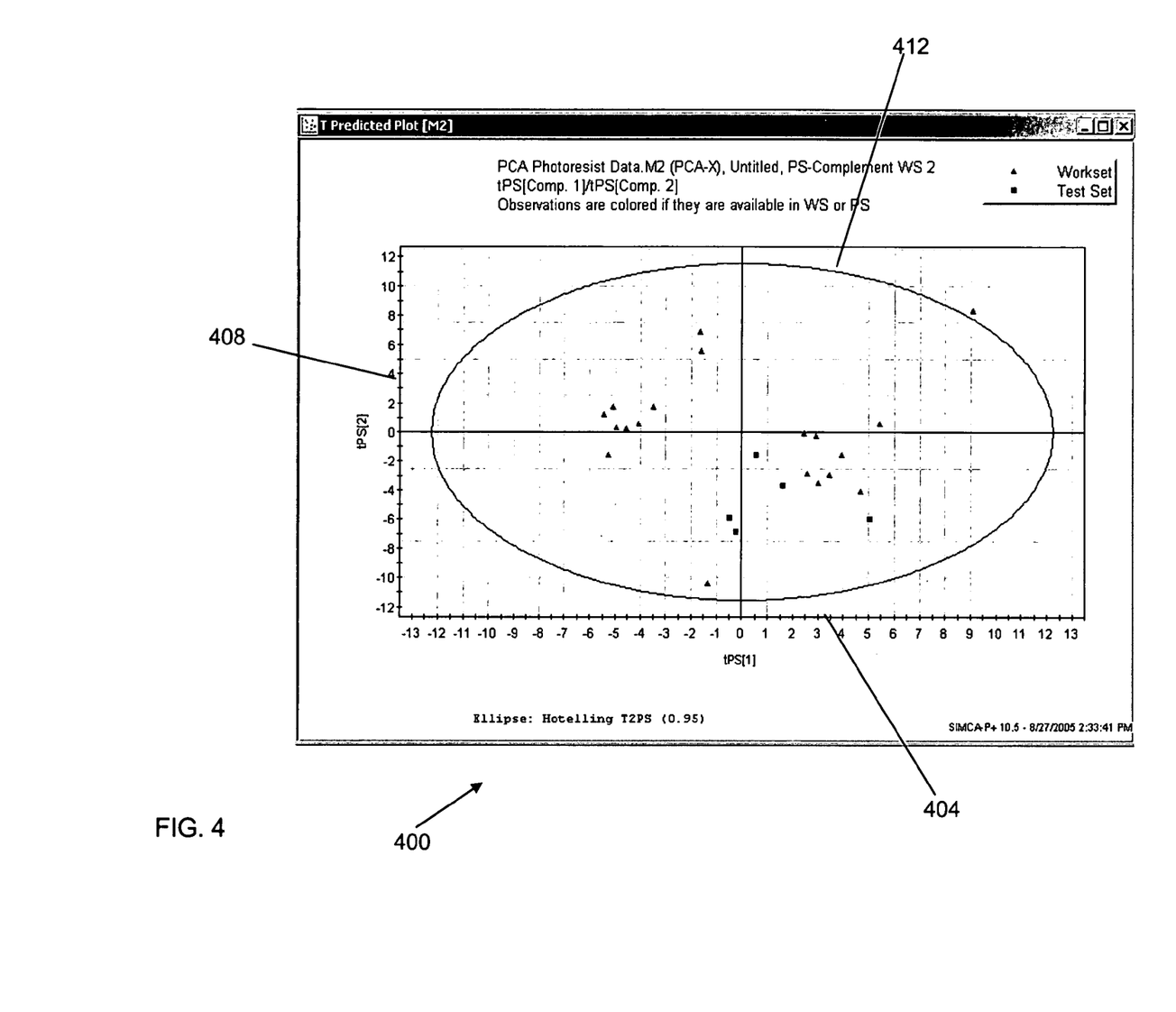
FIG. 4 is a graphical representation of the principal component coefficients ($t_1$ and $t_2$) of non-photoresist wafers and photoresist wafers calculated based on a model using all the manufacturing related variables.

The experiment also involved calculating the principle component coefficient values ($t_1$ and $t_2$) for each of the photoresist wafers (wafers 3, 7, 10, 15, and 18). These principle component coefficients are calculated based on the equations developed for the non-photoresist wafers. FIG. 4 is a plot 400 of all the wafers (wafers 1–24) based on the model developed using just the non-photoresist wafers (wafers 1, 2, 4, 5, 6, 8, 9, 11, 12, 13, 14, 16, 17, 19, 20, 21, 22, 23, and 24). The X-Axis (404) of the plot 400 is the $t_1$ coefficient. The Y-Axis (408) of the plot 400 is the $t_2$ coefficient. Each wafer having no photoresist is identified on the plot 400 with a triangle. Each wafer having photoresist is identified on the plot 400 with a square. The plot 400 also includes an ellipse 412 surrounding the triangles and squares. The ellipse 412 is a curve of the 95% confidence contour that is calculated using the Hotelling equation based on the non-photoresist wafers. The model developed based on the non-photoresist wafers is inadequate for identifying wafers having photoresist because the principle component coefficients for each of the photoresist wafers based on the non-photoresist model are also located within the ellipse 412.

Figure 5:
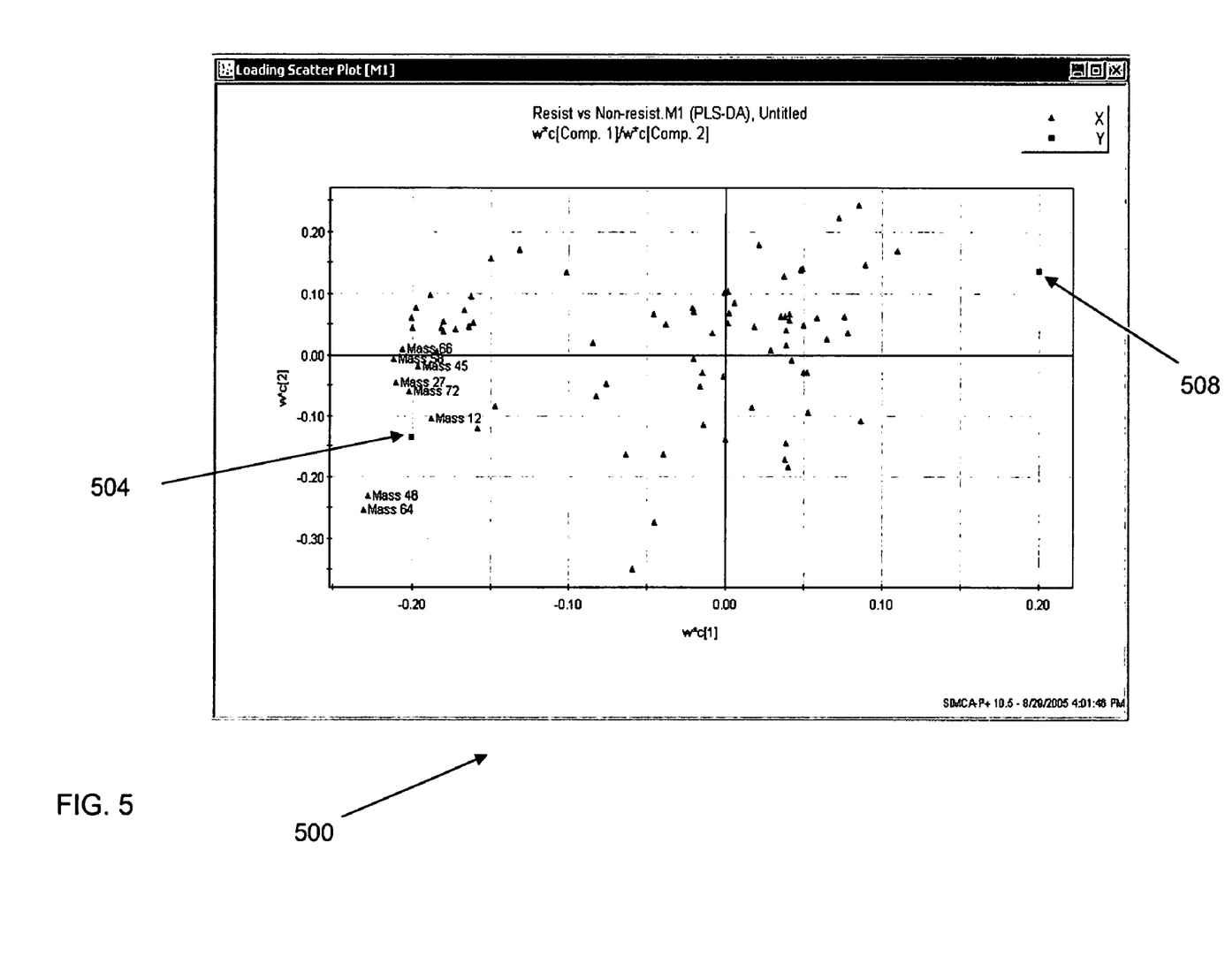
FIG. 5 is a graphical representation of the W* and C coordinates used to identify which manufacturing related variables have a substantial effect on the ability of the model to detect faulty wafers output by the manufacturing process.

Accordingly, as described previously herein regarding the PLSDA method, it is therefore necessary to identify (step 112) those manufacturing related variables (the subset of manufacturing related variables 2 AMU through 80 AMU) that have a substantial effect on the model for detecting faulty outputs of the manufacturing process. In the same manner as described previously herein regarding the PLSDA method and EQNS. 10–25, the W* and C matrices are calculated and superimposed by plotting them in a plane (see plot 500 of FIG. 5). Plot 500 contains the manufacturing related variable coefficients (W*) depicted as triangles. Plot 500 also contains the two features, photoresist wafer class (504) and non-photoresist wafer class (508). The manufacturing related variable coefficients closest in proximity to the photoresist wafer class (504) have a substantial effect on the ability of the model to detect the faulty (having photoresist) outputs of the manufacturing process. The manufacturing related variables labeled Mass 12, Mass 27, Mass 45, Mass 48, Mass 58, Mass 64, Mass 64, Mass 66, and Mass 72 are selected as the substantial manufacturing related variables.

Figure 6:
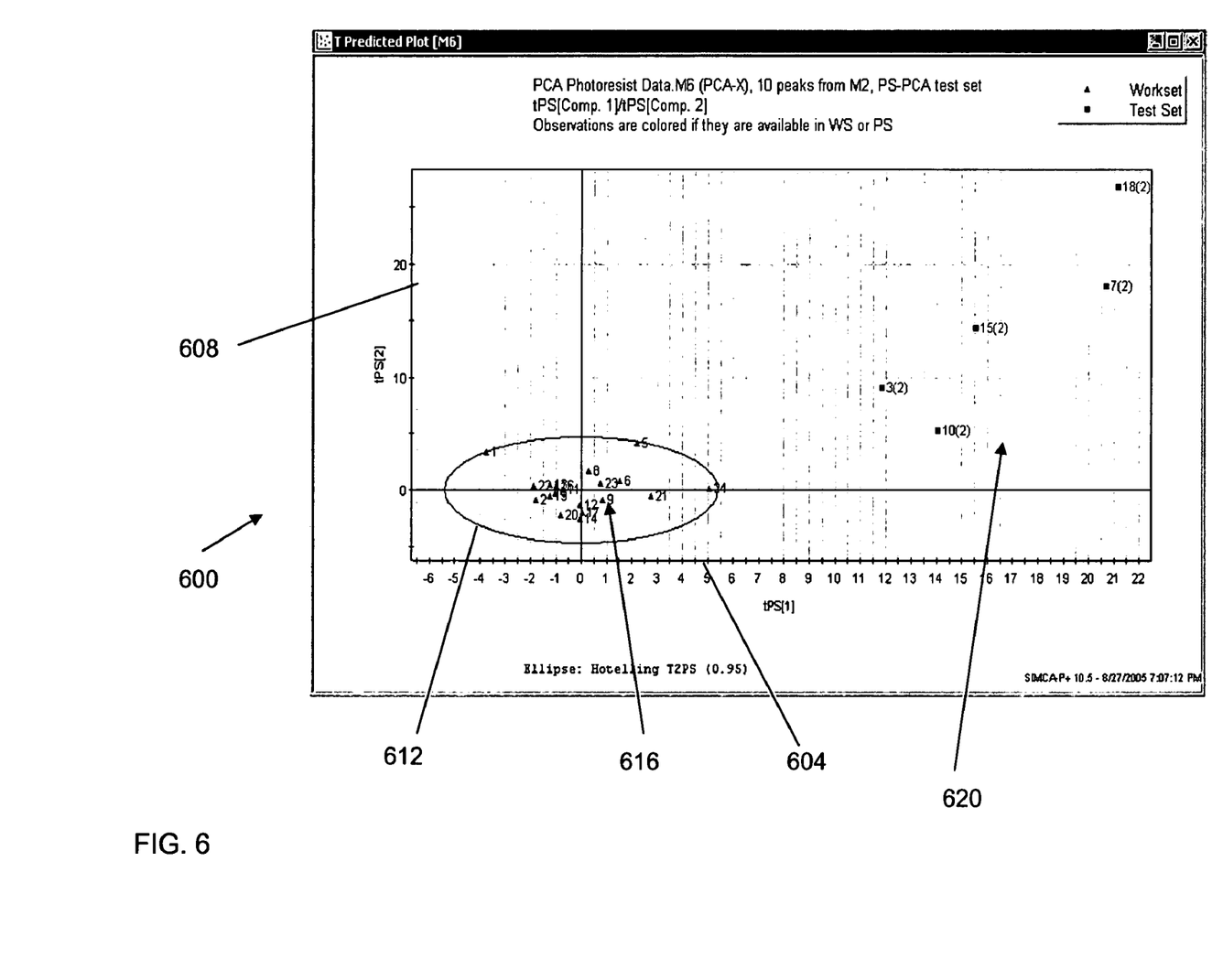
FIG. 6 is a graphical representation of the principle component coefficients ($t_1$ and $t_2$) for both the photoresist wafers and the non-photoresist wafers based on a model using only the substantial manufacturing related variables.

The model was then updated using only those columns (K) of the matrix X corresponding to the substantial manufacturing related variables (step 140 of FIG. 1) in accordance with EQNS. 1–9. The principle component coefficient values ($t_1$ and $t_2$) were calculated for each of the non-photoresist wafers (wafers 1, 2, 4, 5, 6, 8, 9, 11, 12, 13, 14, 16, 17, 19, 20, 21, 22, 23, and 24) based on only the substantial manufacturing related variables (Mass 12, Mass 27, Mass 45, Mass 48, Mass 58, Mass 64, Mass 64, Mass 66, and Mass 72). FIG. 6 is a plot 600 of the principal component coefficients 616 for the non-photoresist wafers (wafers 1, 2, 4, 5, 6, 8, 9, 11, 12, 13, 14, 16, 17, 19, 20, 21, 22, 23, and 24). The X-Axis (604) of the plot 600 is the $t_1$ coefficient.

The Y-Axis (608) of the plot 600 is the $t_2$ coefficient.

Each wafer having no photoresist is identified on the plot 600 with a triangle. The photoresist wafers are surrounded by the curve 612 of the 95% confidence contour that is calculated using the Hotelling equation based on the non-photoresist wafers. The same model was also used to compute the principal component coefficients of the wafers having photoresist (wafers 3, 7, 10, 15, and 18). Each wafer having photoresist is identified on the plot 600 with a square (620). The model developed based on the non-photoresist wafers is adequate for identifying wafers having photoresist because the principle component coefficients for each of the photoresist wafers based on the non-photoresist model are located outside the ellipse 612.

Automatically Identify Variables Having Substantial Effect

Figure 7:
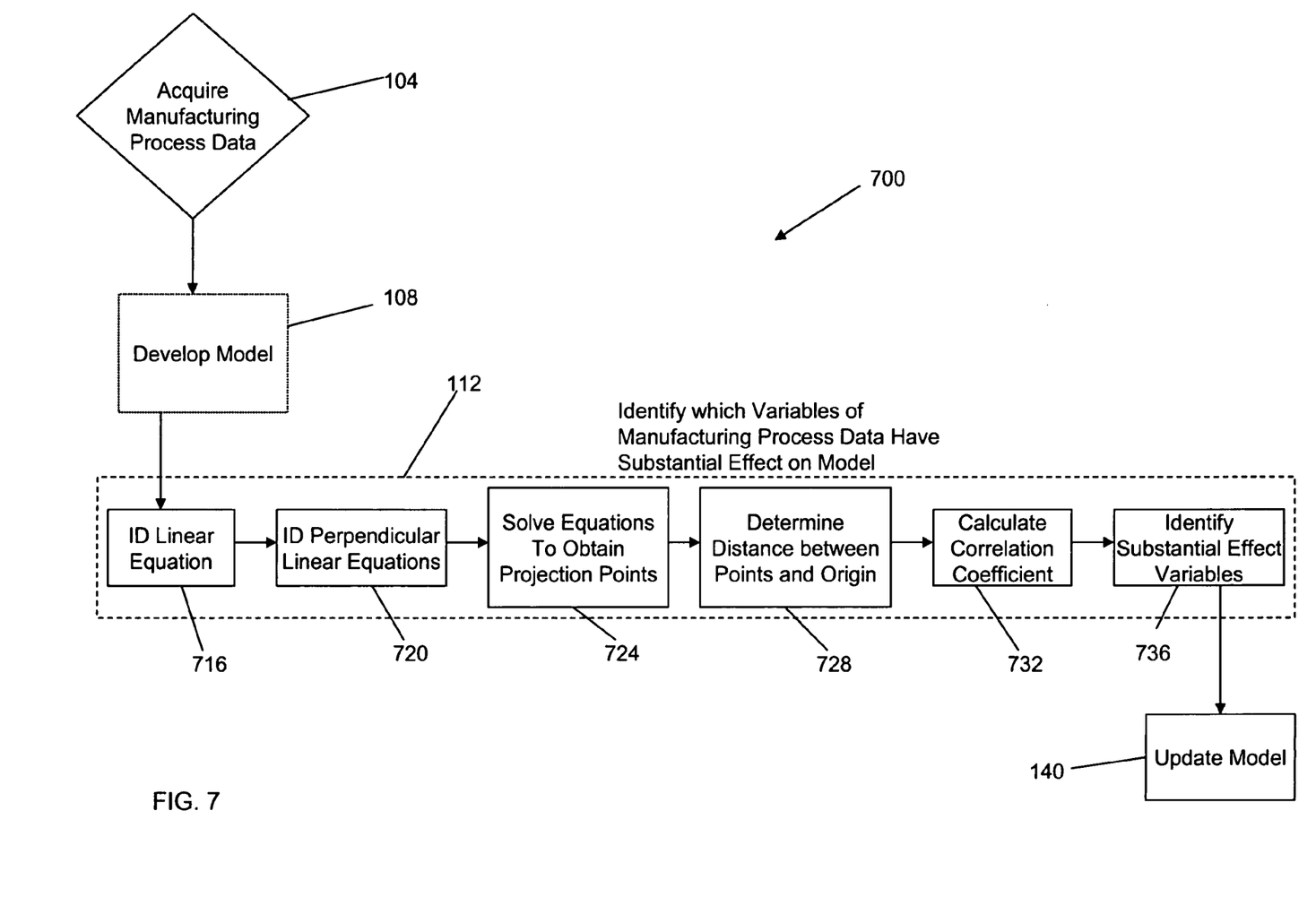
FIG. 7 is a flow diagram of a method for automatically identifying which manufacturing related variables have a substantial effect on the model for detecting faulty outputs of the manufacturing process.

FIG. 7 is a flow diagram 700 of a method for detecting a fault condition of a manufacturing process. The method can be implemented with, for example, a computer processor or personal computer. In this embodiment, the process of the flow diagram 700 begins with acquiring (step 104) data associated with a plurality of manufacturing related variables for a plurality of outputs of a manufacturing process.

The next step in the flow diagram 700 involves developing (step 108) a mathematical model based on the data acquired (step 104). The next step in the flow diagram 700 involves identifying (step 112) which manufacturing related variables have a substantial effect on the model for detecting faulty outputs of the manufacturing process. The next step in the flow diagram 700 involves updating the model (step 140) by using the manufacturing related variables identified in step 112 to improve the ability of the model to detect faulty outputs of the manufacturing process.

In this embodiment, steps 716, 720, 724, 728, 732, and 736 are used to automatically identify which of the manufacturing related variables have a substantial effect on the model for detecting faulty outputs of the manufacturing process. The loadings ($p_1$ and $p_2$) of the $1^{st}$ and $2^{nd}$ principal components are derived as described herein previously regarding EQNS. 10–25 based on all the manufacturing related variables. The step 112 then involves identifying (step 716) a linear equation of a selected variable (e.g., fault condition associated with the manufacturing process or a metrology metric value associated with outputs of the manufacturing process), as described by the following equation:

$$X - \frac{C_x}{C_y} * Y = 0 \qquad \text{EQN. 26}$$

where ($C_x$, $C_y$) is the coordinate of the class or Y matrix variable, ($W_x$, $W_y$) is the coordinate of the manufacturing related variables. EQN. 26 is the equation for the line that connects the origin of the two-dimensional loadings $p_1$ and $p_2$ to the point ($C_x$, $C_y$).

Step 112 then involves, similarly, identifying (step 720) linear equations of the manufacturing related variables that are perpendicular to the linear equation of step 716. Step 112 then involves solving (step 724) the simultaneous equations (e.g., using linear algebra techniques) between every manufacturing related variable linear equation (equations of step 720) and the linear equation of step 716 to obtain a projection point of each manufacturing related variable on the linear equation of step 716, according to the following equation:

$$\begin{bmatrix} 1 & -C_x/C_y \\ 1 & C_y/C_x \end{bmatrix} \begin{bmatrix} X_p \\ Y_p \end{bmatrix} = \begin{bmatrix} 0 \\ (-W_x - C_y/C_x * W_y) \end{bmatrix} \qquad \text{EQN. 27}$$

where ($X_p$, $Y_p$) is the coordinate of the projection point on the line from the point ($W_x$, $W_y$).

Step 112 then involves determining (step 728) the distance between each projection point of step 724 to the origin of the loadings associated with the model (step 108), according to the following equations:

$$r_p = (X_p^2 + Y_p^2)^{1/2} \qquad \text{EQN. 28}$$

$$r_c = (C_x^2 + C_y^2)^{1/2} \qquad \text{EQN. 29}$$

where $r_p$ is the absolute distance from the origin to the point ($X_p$, $Y_p$), and $r_c$ is the absolute distance from the origin to the point ($C_x$, $C_y$).

Step 112 then involves calculating (step 732) a correlation coefficient based on the ratio of distance between the origin and each projected point (step 728) relative to distance of the selected variable to the origin. The correlation coefficient is given by:

$$CorrelationCoefficient = \frac{r_p}{r_c} \qquad \text{EQN. 30}$$

Step 112 then involves identifying (step 736) the substantial manufacturing related variables by selecting the manufacturing related variables that have a correlation coefficient greater than a predefined number ($\beta$):

$$\frac{r_p}{r_c} \rangle \beta \qquad \text{EQN. 31}$$

The predefined number ($\beta$) may be selected in a variety of ways. By way of example, the predefined number may be selected by a user based on the experience of the user. The model is then updated, similarly as described previously herein, using only those columns (K) of the matrix X corresponding to the substantial manufacturing related variables (step 140 of FIG. 1) in accordance with EQNS. 1–9.

Figure 8:
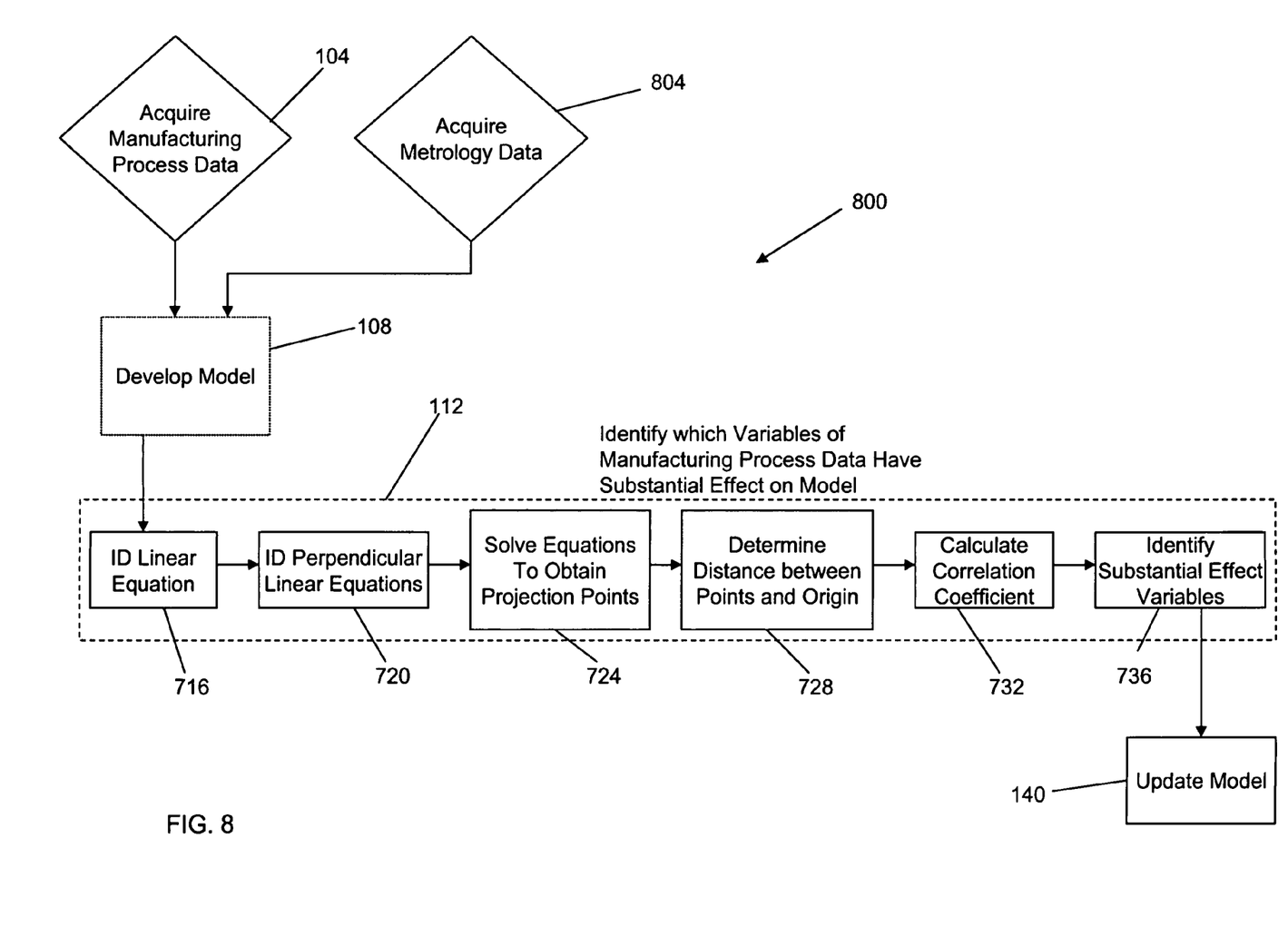
FIG. 8 is a flow diagram of a method for simultaneously detecting and classifying a fault condition of a manufacturing process.

FIG. 8 is a flow diagram 800 of a method for simultaneously detecting and classifying a fault condition of a manufacturing process. The method can be implemented with, for example, a computer processor or personal computer. In this embodiment, the process of the flow diagram 800 begins with acquiring (step 104) data associated with a plurality of manufacturing related variables for a plurality of outputs of a manufacturing process. The process also involves acquiring (step 804) metrology data (e.g., fault class data) associated with outputs of the manufacturing process.

The next step in the flow diagram 800 involves developing (step 108) a mathematical model based on the data acquired (step 104) and the metrology data acquired (804). The model is developed similarly, as previously described herein regarding EQNS. 10–25, where the metrology data is used to form the Y-matrix. In one embodiment, the metrology data is the PRIndex (a measurement of the amount of photoresist contamination on the surface of a semiconductor wafer).

The next step in the flow diagram 800 involves identifying (step 112) which manufacturing related variables have a substantial effect on the model for detecting faulty outputs of the manufacturing process. In this embodiment, the identifying step (step 112) is automatically performed in the same manner as previously described regarding FIG. 7 and EQNS. 26–31.

The next step in the flow diagram 800 involves updating the model (step 140) by using the manufacturing related variables identified in step 112 to improve the ability of the model to detect faulty outputs of the manufacturing process. The model is also capable of estimating the value of the metrology metric corresponding to outputs of the manufacturing process because the metrology data acquired in step 804 is used to construct the Y-matrix. In this manner, the model developed is capable of detecting faults, identifying the particular fault, and predicting the metrology metric value associated with additional outputs of the manufacturing process.

Variations, modifications, and other implementations of what is described herein will occur to those of ordinary skill in the art without departing from the spirit and the scope of the invention and are considered to be encompassed thereby. Accordingly, the invention is not to be defined only by the preceding illustrative description.

What is claimed is:

1. A method for detecting a fault condition of a manufacturing process, comprising:
    a) acquiring data associated with a plurality of manufacturing related variables for a plurality of outputs of a manufacturing process;
    b) developing a model based on the data for detecting faulty outputs of the manufacturing process;
    c) automatically identifying which of the manufacturing related variables have a substantial effect on the model for detecting faulty outputs of the manufacturing process using a mathematical algorithm; and
    d) updating the model by using the manufacturing related variables identified in step c) to improve the ability of the model to detect faulty outputs of the manufacturing process,
    wherein using a mathematical algorithm comprises,
        i) identifying a linear equation of a selected variable to the origin of the loadings associated with the mode;
        ii) identifying linear equations of the manufacturing related variables that are perpendicular to the linear equation of step i);
        iii) solving the simultaneous equations between every manufacturing related variable linear equation and the linear equation of step i) to obtain a projection point of each manufacturing related variable on the linear equation of step i);
        iv) determining the distance between each projection point to the origin;
        v) calculating a correlation coefficient based on a ratio of distance between the origin and each projected point relative to distance of the selected variable to the origin; and
        vi) identifying the substantial manufacturing related variables by selecting the manufacturing related variables that have a correlation coefficient greater than a predefined number.

2. The method of claim 1, wherein steps b), c) and d) comprise utilizing a multivariate analysis technique.

3. The method of claim 1, wherein step b) comprises computing principal components and loadings associated with the model using a non-linear iterative partial least square method and singular value decomposition.

4. The method of claim 1, wherein step c) comprises utilizing a partial least square discrimination analysis method.

5. The method of claim 1, wherein the selected variable is a fault condition or a metrology metric value.

6. The method of claim 1, wherein the predefined number is selected by a user.

7. A method for detecting a fault condition of a manufacturing process, comprising:
    a) identifying which of a plurality of manufacturing related variables for a plurality of outputs of a manufacturing process have a substantial effect on a model for detecting faulty outputs of a manufacturing process by:
        i) identifying a linear equation of a selected variable to the origin of the loadings associated with the model;
        ii) identifying linear equations of the manufacturing related variables that are perpendicular to the linear equation of step i);
        iii) solving the simultaneous equations between every manufacturing related variable linear equation and the linear equation of step i) to obtain a projection point of each manufacturing related variable on the linear equation of step i);
        iv) determining the distance between each projection point to the origin;
        v) calculating a correlation coefficient based on a ratio of distance between the origin and each projected point relative to distance of the selected variable to the origin; and
        vi) identifying the substantial manufacturing related variables by selecting the manufacturing related variables that have a correlation coefficient greater than a predefined number; and
    b) automatically updating the model by using the manufacturing related variables identified in step a) to improve the ability of the model to detect faulty outputs of the manufacturing process.

8. The method of claim 7, wherein steps a) and b) comprise utilizing a multivariate analysis technique.

9. The method of claim 7, wherein step a) comprises utilizing a partial least square discrimination analysis method.

10. The method of claim 7, wherein the selected variable is a fault condition or a metrology metric value.

11. The method of claim 7, wherein the predefined number is selected by a user.

* * * * *

UNITED STATES PATENT AND TRADEMARK OFFICE
CERTIFICATE OF CORRECTION

| | | |
|---|---|---|
| PATENT NO. | : 7,151,976 B2 | Page 1 of 1 |
| APPLICATION NO. | : 11/229153 | |
| DATED | : December 19, 2006 | |
| INVENTOR(S) | : Lin | |

It is certified that error appears in the above-identified patent and that said Letters Patent is hereby corrected as shown below:

On Title Page, Item (56), under References Cited-U.S. Patent Documents, please insert --5,442,562; 5,710,700; 5,949,678; 6,556,884 --

Column 13, line 44, please replace "mode" with -- model --

Signed and Sealed this

Sixth Day of March, 2007

JON W. DUDAS
*Director of the United States Patent and Trademark Office*